United States Patent [19]
Stötzel et al.

[11] Patent Number: 4,978,233
[45] Date of Patent: Dec. 18, 1990

[54] HYDROSTATIC BEARING ASSEMBLY

[75] Inventors: Gilbert Stötzel, Düsseldorf; Jörg Führmann, Weisendorf; Joachim Schneider, Düsseldorf, all of Fed. Rep. of Germany

[73] Assignee: Ina Lineartechnik Ohg, Homburg/Saar, Fed. Rep. of Germany

[21] Appl. No.: 408,712

[22] Filed: Sep. 18, 1989

[51] Int. Cl.$^5$ .............................................. F16C 32/06
[52] U.S. Cl. .......................................... 384/12; 384/42
[58] Field of Search ....................... 384/12, 13, 100, 7, 384/8, 42

[56] References Cited

U.S. PATENT DOCUMENTS

| | | | |
|---|---|---|---|
| 3,508,430 | 4/1970 | Edmondson | 384/12 X |
| 4,080,009 | 3/1978 | Marathe et al. | 384/12 |
| 4,448,460 | 5/1984 | Yamamoto | 384/12 |
| 4,506,935 | 3/1985 | Suzuki et al. | 384/12 |
| 4,584,916 | 4/1986 | Inoue et al. | 384/12 X |
| 4,606,587 | 8/1986 | Thompson | 384/12 |

FOREIGN PATENT DOCUMENTS

| | | |
|---|---|---|
| 2043702 | 3/1971 | Fed. Rep. of Germany . |
| 2203888 | 8/1973 | Fed. Rep. of Germany . |
| 2847882 | 5/1980 | Fed. Rep. of Germany . |
| 2164275 | 3/1986 | United Kingdom . |

Primary Examiner—Thomas R. Hannon
Attorney, Agent, or Firm—Toren, McGeady & Associates

[57] ABSTRACT

A hydrostatic bearing assembly highly adaptable to different types of applications, with the actual guiding and bearing functions being associated with guiding rails and separate carrying elements comprising separate bearing elements, the separately produced bearing elements having pressure pockets pressurized by a pressure agent, so as to permit a reduction in production costs and a better adaptation to required conditions of play so as to achieve a higher load bearing capacity.

22 Claims, 6 Drawing Sheets

HYDROSTATIC BEARING ASSEMBLY

BACKGROUND OF THE INVENTION

The invention relates to a hydrostatic bearing assembly for accommodating horizontal and/or vertical bearing forces for a slide movable along a guiding rail and associated with at least one separate bearing element which is provided with at least one pressure pocket facing the guiding face of the guiding rail and connected to a pressure agent pipeline which is provided with a pressure agent by a pressure source via a pipeline.

In the case of hydrostatic bearing assemblies, it is known to form receiving blocks onto the slide provided for guiding purposes along a guiding rail, which receiving blocks are provided with bores for accommodating bushes comprising pressure pockets. These guiding rails are designed as round bars, and pressure agent channels are provided in the slide (see U.S. Pat. No. 4,506,935).

In the case of hydrostatic bearing assemblies it is also known to work the pressure pockets into the slide provided for guiding purposes along a guiding rail and to provide the pressure agent channels in the slide, with separate pressure pockets for receiving horizontal and vertical forces being as a rule provided in faces arranged at a right angle relative to each other (see GB No. 2,164,275 B).

A problem with these known assemblies is that for each new application it is necessary to renew the elements participating in the guiding operation, and in addition, machining is expensive since the receiving blocks and channels and possibly the pressure pockets have to be produced directly on the slide.

SUMMARY OF THE INVENTION

Accordingly, it is an object of the present invention to provide a bearing assembly which may be used for a multitude of applications without the need for special adaptation measures or substantial machining operations at the slide.

Pursuant to this object, and others which will become apparent hereafter, one aspect of the present invention resides in a guiding rail, viewed in cross-section, designed as a polygon with guiding faces and a fixing portion. Additionally, the bearing element is a separate component received in a separate supporting element fixable to the slide, with both of them, as one unit, partially embracing the guiding rail and with the bearing element facing the guiding faces of the guiding rail comprising the pressure pockets.

With the help of the inventive design of associating the pressure pockets with separate bearing elements, i.e., no longer arranging them directly in the slide, it is possible to provide a bearing assembly adaptable to the most varied applications. In other words, it is possible to use standardized carrying elements movable along guiding rails which are also separate and have to be provided at the machine bed.

Depending on the support conditions, several carrying elements with pressure pockets may be associated with the slide to be guided.

In a preferred embodiment, two guiding rails are provided spaced at a parallel distance from one another, and at least three carrying elements are provided per slide, separately supported thereupon, a precondition being that the pressure pockets of the various carrying elements are connected to each other so that a uniform pressure can build up and so that there occur identical conditions of play relative to the guiding rails. For this reason, the invention proposes that the carrying elements should be provided with connections for pressure agent pipelines connecting the pressure pockets of the carrying elements to each other and to a pressure source, as well as with channels opening into the pressure pockets.

In a further embodiment, the guiding faces of the guiding portion and an imaginary connecting face between it and the fixing portion, viewed in cross-section, form a hexagon whose guiding faces are covered by a unit consisting of the bearing element and the carrying element. Such a design ensures that the bearing forces are accommodated particularly advantageously.

In still another embodiment, when viewed in cross-section, the edge lengths of two oppositely arranged faces of the hexagon, one of which is the imaginary connecting face, are greater than the edge lengths of the equally long edges of the remaining four guiding faces. This design ensures that in one direction it is possible to accommodate a greater load.

By providing the bearing elements with pressure pockets as separate components and subsequently connecting them to the carrying elements it is possible to produce the bearing elements from a different material, and according to a further feature of the invention, the bearing element is a bendable plate of a smaller material thickness and consists of a friction bearing material having dry running properties, into which plate the pressure pocket has been formed prior to being bent.

Alternatively, it is possible to design the bearing element as a formed part, the advantage of this design being that the production method permits a high degree of repeatable production accuracy as the forming tool determines the tolerances.

Alternatively, the bearing element may be an aluminum pressure die casting or a plastic injection molded part.

By separating the bearing elements from the carrying elements it is possible to use a softer material having the required dry running properties. Because of the strength and accuracy of the carrying elements a good guiding quality can nevertheless be achieved.

In still a further embodiment there is provided, per bearing element, a pressure pocket covering all guiding faces.

However, depending on the application, it may also be advantageous if, per guiding face of the guiding rail, the bearing element comprises at least two pressure pockets.

By providing several pockets, a balance is achieved even in the case of a unilateral load due to the resulting pressure increase in the pressure pockets subjected to the higher load.

The invention further proposes that the bearing element, on its outer face received in the carrying element, should comprise connecting channels for connecting the pressure pockets via throttle bores to the pressure agent pipeline.

Furthermore, the bearing element is provided with a collecting groove arranged at a distance from the border edge of the pressure pocket so as to extend around it, to be open towards the guiding faces and connected to a collecting pipeline.

If some of the pressure agent emerges, it is returned via the collecting groove and the collecting pipeline and may be reintroduced into the pressure agent circuit following regeneration. Furthermore, it is possible to identify any leakages by measuring the returned amount of pressure agent. If a permissible amount is exceeded, the gap occurring between the guiding faces and the running face of the bearing element has increased to an impermissible extent. The collecting pipeline may be connected to a suction pump, for instance, in order to facilitate the return flow.

Furthermore, for increasing the supporting area of the guiding faces and the respective running faces of the bearing element, it is possible for the guiding rail in the region of the fixing portion to be provided with two further supplementary guiding faces arranged at an angle relative to the adjoining guiding faces.

In a further preferred embodiment, the angle enclosed between the supplementary guiding faces and the adjoining guiding faces amounts to a maximum of 90°.

To improve the carrying characteristics and the guiding quality, the carrying face of the running face of the bearing element should rest in a pressure-less condition with pretension against the guiding faces. Such a design is possible as a result of separating the components participating in the guiding motion, and especially by providing a bearing element and a carrying element. The gap setting required for good running characteristics may be achieved by running-in the bearing element relative to the guiding rail or rather the guiding faces of the guiding rail. The most favorable conditions of play are achieved as a result of wear.

Such running-in characteristics are not achievable by state of the art solutions in the case of which the pressure pockets are provided directly in the guiding slide as these have to have the necessary strength for the carrying characteristics as a whole, whereas with the design in accordance with the invention the necessary strength is obtained by the carrying element, and the bearing element may be designed to achieve optimum bearing characteristics.

In yet another embodiment, the pressure pockets take up an area percentage of approximately 70 to 90% of the area of the bearing element facing the guiding faces and the supplementary guiding faces. Such an arrangement ensures that a sufficiently high area percentage of the bearing element is available when the assembly is stationary, i.e., when no pressure is applied.

As a result of the continuous pocket design, i.e., due to the fact that the pocket covers all guiding faces without being divided, it is ensured without fail that the same pressure prevails relative to all guiding faces.

An assembly with pretension ensures that in the stationary condition there occur no losses exceeding normal losses because when there is no pressure, the gap is reduced and when pressure is applied to the pressure agent, the carrying element expands because of its C-shaped design.

Furthermore, in a still further embodiment of the invention, the finish-dimension of the guiding portion of the running face of the bearing element is produced by broaching after fixing it to the associated carrying element. In this way it is possible to achieve the desired guiding characteristics. The bearing element may first be produced to an approximate dimension, with the necessary guiding quality being achieved after the bearing element has been assembled in the carrying element. Because the bearing element is produced from a softer material than the carrying element, broaching in the softer material is easier than in a slide in which the pressure pockets are provided directly.

It is therefore possible to achieve a better guiding quality. Furthermore, broaching has an advantage in that any machining grooves occurring in the course of machining extend in the direction of the guiding motion of the bearing element and do not generate any additional friction.

Finally, this design simplifies machining and production of the individual carrying elements. Also, there may take place an additional operation in the case of which a special guiding rail is used, for example, in order to smooth and calibrate the guiding cross-section and thus the percentage of carrying area of the bearing elements by cold forming.

In a preferred embodiment, the pressure pockets have a depth of 0.5 to 1 mm. However, it is also conceivable to select a square so that the guiding rail has an H-profile.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
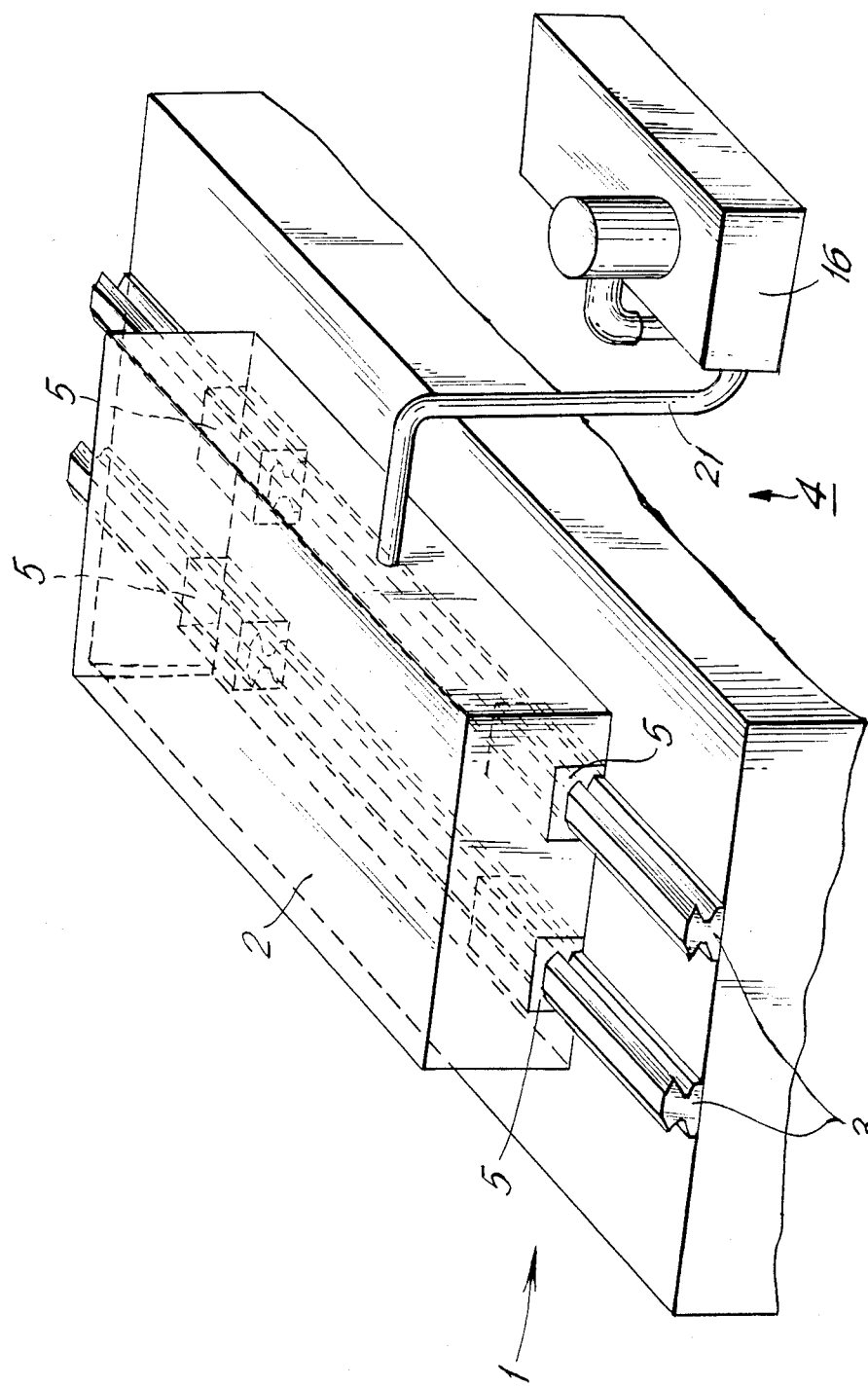
FIG. 1 shows a bearing assembly with four carrying elements.

FIG. 1 shows a bearing assembly 1 of a slide 2 representing the workpiece receiving table of a milling machine, for example. The slide 2 is associated with four carrying elements 5 movably arranged along guiding rails 3. The carrying elements 5 are designed as separate hydrostatic bearing elements which may be associated in any smaller or larger number with the slide 2.

The individual carrying elements 5 are connected to each other and to a pressure source 16 via a pressure agent pipeline 21. The design of the individual carrying elements 5 and the guiding rails 3 is explained in more detail in connection with FIGS. 2 to 6.

Figure 2:
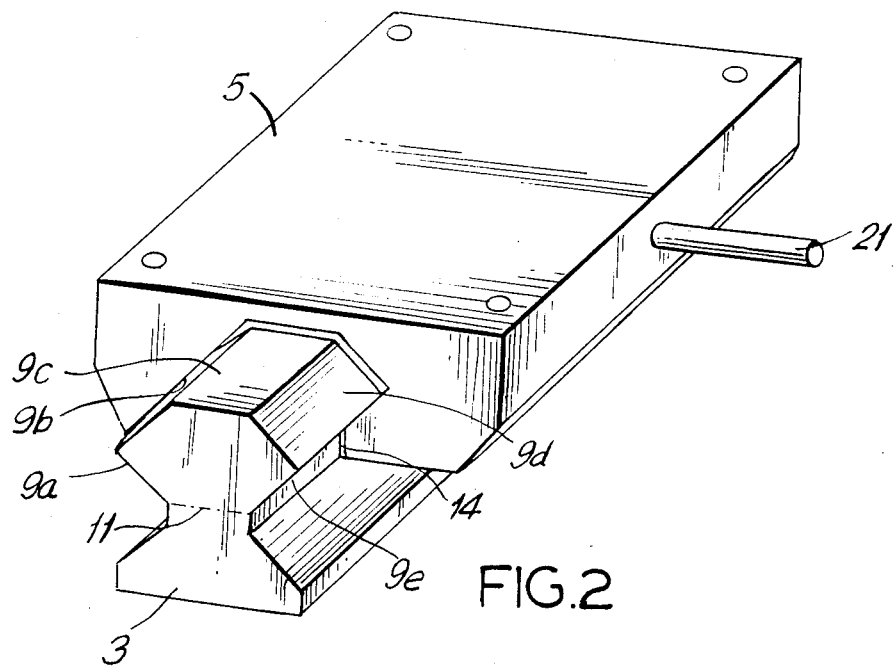
FIG. 2 shows an individual carrying element supported on a guiding rail.
Figure 4:
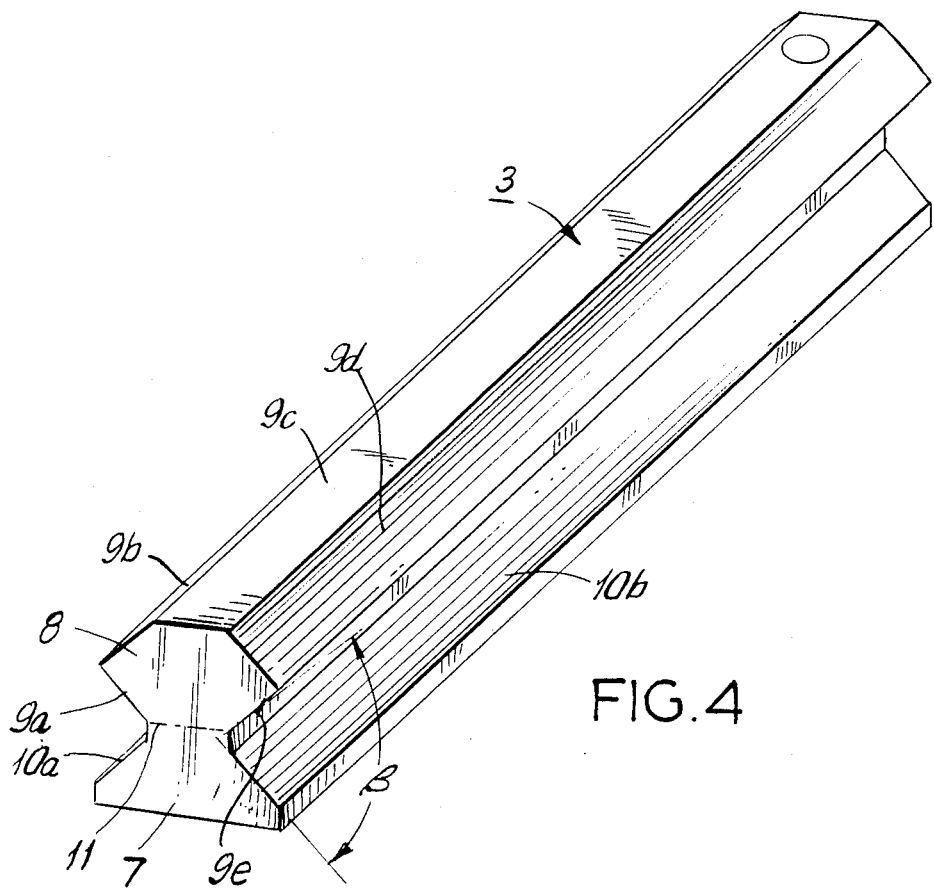
FIG. 4 shows a guiding rail.

As can be seen particularly clearly in FIGS. 2 and 4, the guiding rail 3 comprises a guiding portion 8 and a fixing portion 7. The guiding portion 8 comprises five faces. If viewed in cross-section, the guiding faces 9a, 9b, 9c, 9d and 9e form part of a hexagon, with the imaginary connecting face 11 between the fixing portion 7 and the guiding portion 8, in cross-section, forming an edge of the hexagon, with the guiding face 9c being arranged opposite it. These two faces preferably have edge lengths which are greater than those of the remaining four guiding faces 9a, 9b, 9d and 9e.

Figure 6:
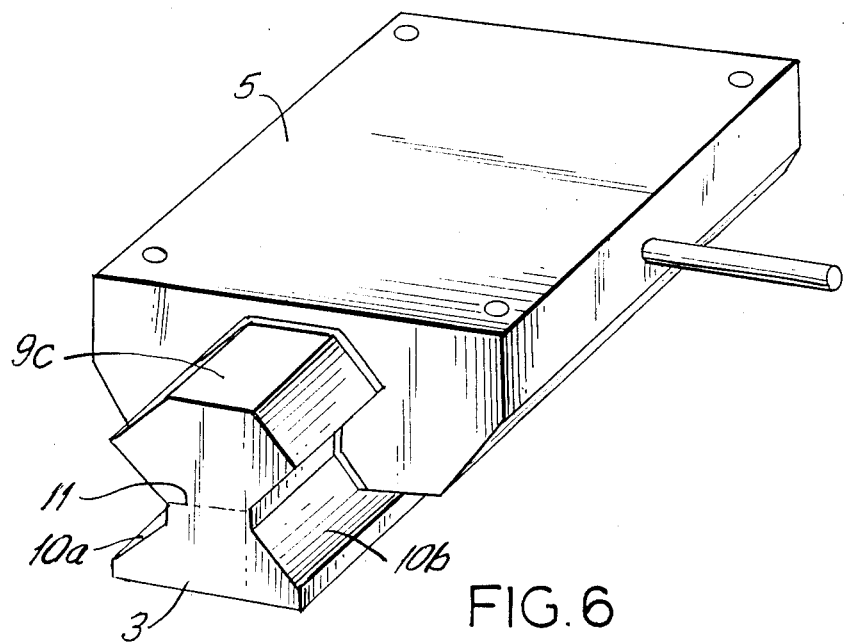
FIG. 6 shows an assembly with supplementary guiding faces.
Figure 5:
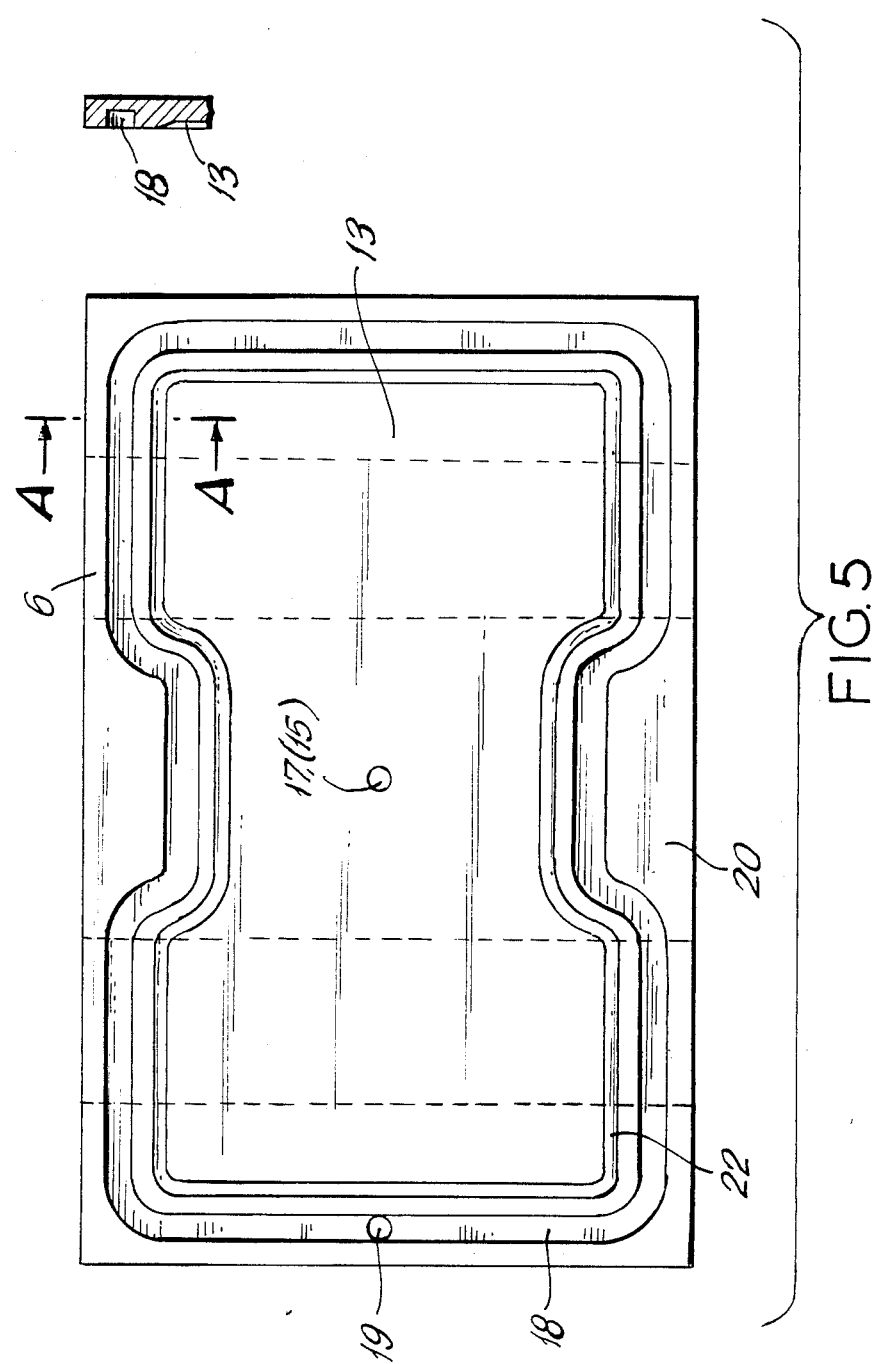
FIG. 5 is a developed view of the bearing element according to FIG. 3.
Figure 7:
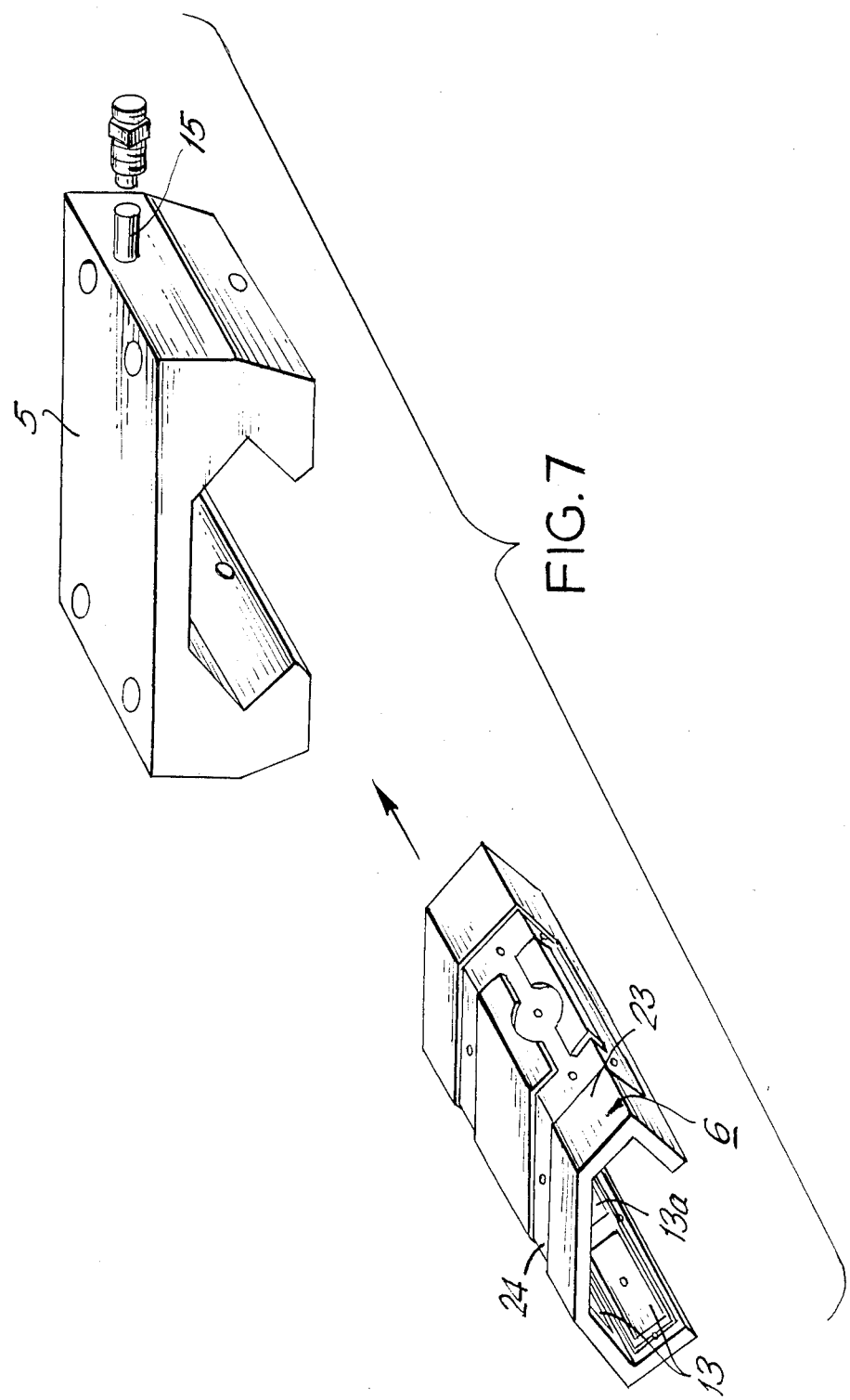
FIG. 7 illustrates a bearing element designed as a formed part and the associated carrying element in an exploded view.

As can been seen in FIGS. 4 and 6, it is possible to provide two supplementary guiding faces 10a, 10b arranged directly at the fixing portion 7. These two supplementary guiding faces 10a, 10b may adjoin directly one of the guiding faces 9a and 9e or they may be arranged at a distance from these with a transition face therebetween. The guiding faces 9e and 9a and the supplementary guiding faces 10b and 10a face each other and enclose an angle $\beta$ which amounts to a maximum of 90°.

Figure 8:
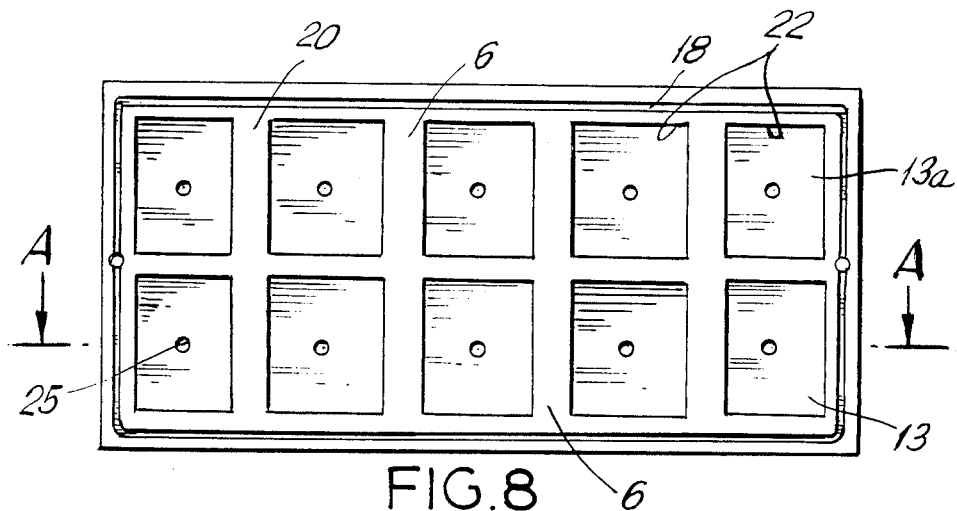
FIG. 8 is a developed view of the bearing element according to FIG. 7.
Figure 9:
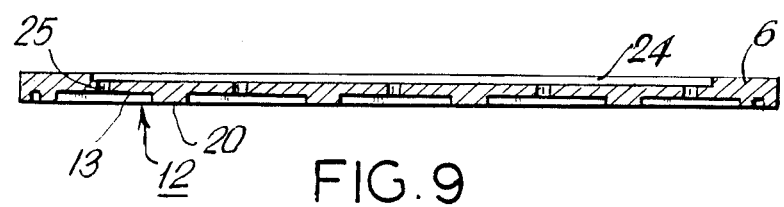
FIG. 9 is a section along the line A—A in FIG. 8.
Figure 10:
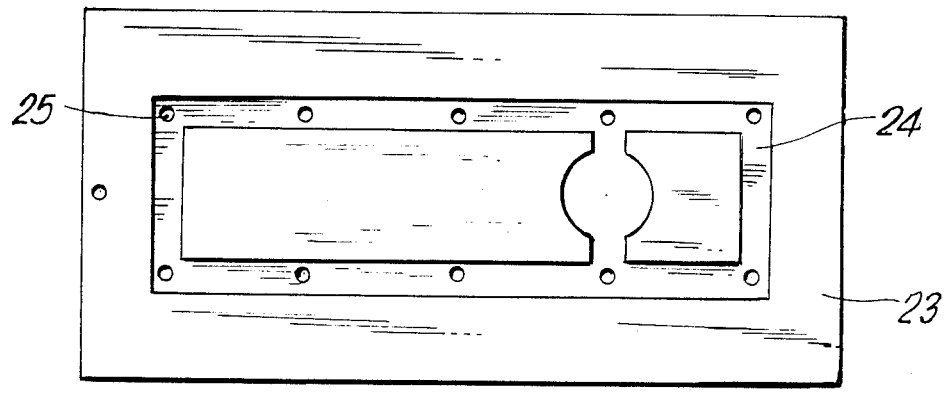
FIG. 10 is a developed view of the bearing element of FIG. 7 with a view of the outer face which corresponds to a plan view according to FIG. 5.

At the guiding faces 9a, 9b, 9c, 9d, 9e, and the supplementary guiding faces 10a and 10b, there is movably arranged a carrying element 5, each with intermediate bearing elements 6. The bearing elements 6 are separate from the carrying elements 5 and are inserted into these. The carrying elements 5 comprise an aperture which approximately corresponds to the profile of the guiding rail 3 provided for guiding purposes, but which has greater dimensions so as to be able to accommodate the bearing element 6. Two embodiments of the bearing element 6 are illustrated in a developed view in FIG. 5 and in FIGS. 8–10. In the case of the embodiments of FIGS. 3 and 5, the bearing elements 6 are planar formations having the shape of a plate of a thinner material thickness, and preferably produced from a friction material having dry running characteristics. For this purpose, it is possible, for example, to use a material distributed under the trademark "Permaglide" ® and consisting of a sintered copper alloy into which polytetrafluoroethylene particles are embedded.

The bearing element 6 comprises an indentation in the form of a pressure pocket 13 having a depth of 0.5 to 1 mm. The pressure pocket 13 is surrounded by a groove 18 extending at a distance from an edge 22 of the pressure pocket 13. The pressure pocket 13 of the bearing element 6 is connected via a channel 17 and a pipeline 15 to the pressure agent pipeline 21 and via these to the pressure source 16 and the other carrying elements 5. By pressurizing the pressure pocket 13 with a pressure agent, load is accommodated via the area percentage taken up by the pressure pocket 13. There is produced a hydrostatic cushion on which the carrying elements and the slide 2 carried by them are movable along the guiding rails 3 and their guiding faces 9, 10, the pressure pocket 13 facing the guiding faces 9, 10. The remaining face of the bearing element 6 serves as an emergency running face and as a face 20 statically receiving the load and also as a sealing face. The area of the pressure pocket preferably takes up approximately 70 to 90% of the total area of the bearing element 6. The plate-shaped bearing element 6 is produced as a separate component and is subsequently deformed in such a way that it can be inserted into the aperture of the carrying element 5 covering the guiding faces 9 and the supplementary guiding faces 10 at least partially while having a sealing effect on the remaining face 20.

Figure 3:
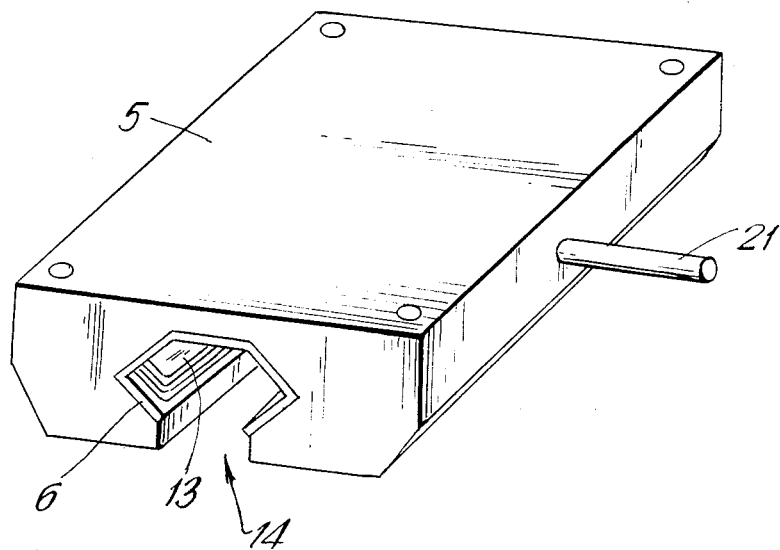
FIG. 3 illustrates a carrying element with a first embodiment of a bearing element.

As can be seen from FIGS. 2 and 3, the bearing element 6 and the carrying element 5 leave a slot 14 open from which the fixing portion 7 of the guiding rail 3 projects. Separation of the bearing element 6 and the carrying element 5 permits an advantageous production of the bearing elements 6 and adaptation to the required tolerances to achieve the required bearing clearances necessary for a guiding operation taking place with low pressure agent losses, accompanied by low production costs. In this way, the bearing element 6, after having been introduced into the carrying element 5, is adapted by broaching to the final dimensions. As broaching takes place in a relatively soft material, machining of the finished component is simple and fast. Any grooves which may occur extend in the direction of the motion of the carrying element at the guiding rail and do not greatly interfere. Furthermore, smoothing occurs because the material of the bearing element 6 is softer than the base material of the guiding rail 3 which, for load receiving purposes and without any disadvantageous deformation, has to be designed to be suitably rigid and have sufficiently high strength values. Broaching is preferably carried out in such a way that there occurs a pretension which, as a result of the pressure applied by the pressure agent, is at least partially eliminated again because due to its bracket-like design, the carrying element 5 somewhat expands under the load. Preferably, there should occur a play of a few hundredths of a millimeter. The collecting groove 18 shown in FIG. 5 and the partial section serves to receive any pressure agent emerging from the pressure pockets 13 and the gap between the running face 12 and the guiding faces 9, 10 of the guiding rail 3 and returns it via the return pipe 19. The return pipe may be connected to a suction pump so that vacuum prevails in the suction channel 18. The pressure range envisaged for pressurizing the pressure pockets 13 is between 20 and 100 bar, depending on the type of application.

The supplementary guiding faces 10a and 10b are not absolutely essential, and should be provided only if a higher bearing capacity is required. The continuous design of the pressure pockets 13, i.e., the fact that they extend across all participating guiding faces 9, 10 has the advantage of achieving a centric alignment of the carrying element 5 relative to the guiding rail 3. Assembly involving pretension is advantageous in that even in the stationary condition when the pressure pockets 13 are not pressurized, alignment of the slide 2 via the carrying element 5 is maintained with, furthermore, the remaining carrying faces 2 resting closely against the guiding faces 9, 10. In this way, pressure agent, although pressure-less, is prevented from emerging in the stationary condition. In case of the design variant of the bearing element according to FIGS. 8–10, the running face 12, per guiding face 9a–e, comprises at least two pressure pockets 13, 13a with a depth of 0.5 to 1 mm as well as the carrying face 20 representing the remaining area.

The pressure pockets 13, 13a are surrounded by a groove 18 which extends at a distance from the edge 22 of the pressure pockets 13, 13a. The pressure pockets 13, 13a of the bearing element 6 are connected to the other bearing elements 6 via throttle bores 25, connecting channels 24 formed into the outer face 23 and the pressure agent pipeline 15 and to the pressure source 16 via the pressure agent pipeline 21. By pressurizing the pressure pockets 13, 13a with the pressure agent, the load is accommodated via the area percentage taken up by the pressure pockets 13, 13a. There is produced a hydrostatic cushion on which the carrying elements 5 and the slide 2 carried by them are movable along the guiding rails 3 and their guiding faces 9, 10. The pressure pockets 13, 13a face the guiding faces 9a–e. The remaining area of the bearing element 6 serves as an emergency running face and as area 20 statically receiving the load, and also as a sealing face. In a preferred embodiment, the area of the pressure pockets 13, 13a also takes up approximately 70 to 90% of the total area of the bearing element 6. The bearing element 6 is produced separately as a formed part and is subsequently inserted into the aperture of the carrying element 5.

The throttle bores 25 ensure a slow pressure balance and a return effect.

The collecting groove 18 serves to collect and return any pressure agent emerging from the pressure pockets 13, 13a and from the gap between the running face 12 and the guiding faces 9, 10 of the guiding rail 3.

While the invention has been illustrated and described as embodied in a hydrostatic bearing assembly, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

We claim:

1. A hydrostatic bearing assembly for a slide, comprising:
   at least one guiding rail (3) having a polygonal cross-section with a guiding portion having guiding faces (9a-e), and a fixing portion (7), said slide being movable along said guiding rail;
   at least one carrying element (5) fixable to said slide (2);
   a separate bearing element (6) arranged in said carrying element (5), said carrying element and said bearing element being formed so as to partially embrace said guiding rail as a single unit so that said bearing element faces the guiding faces of the guiding rail, said bearing element having at least one pressure pocket arranged so as to face at least one of the guiding faces of the at least one guiding rail; and
   means for supplying a pressure agent to said at least one pressure pocket.

2. A bearing assembly according to claim 1, wherein two guiding rails (3) are provided spaced at a parallel distance from one another and at least three carrying elements (5) are provided per slide (2), separately supported thereupon.

3. A bearing assembly according to claim 1, wherein the guiding faces (9a, b, c, d, e) of the guiding portion (8) and an imaginary connecting face (11) between the guiding portion (8) and the fixing portion (7), viewed in cross-section, form a hexagon whose guiding faces (9a, b, c, d, e) are covered by a unit made up of the bearing element (6) and the carrying element (5).

4. A bearing assembly according to claim 3, wherein, viewed in cross-section, edge lengths of two oppositely arranged faces (9c, 11) of the hexagon, one of which faces is the imaginary connecting face (11), are greater than edge lengths of the equally long edges of the remaining four guiding faces (9a, b, d, e).

5. A bearing assembly according to claim 1, wherein the bearing element (6) is a bendable plate of a small material thickness and is made of a friction bearing material having dry running properties, the pressure pocket (13) being formed in the plate prior to being bent.

6. A bearing assembly according to claim 1, wherein the bearing element (6) includes at least two pressure pockets (13, 13a) per guiding face of the guiding rail.

7. A bearing assembly according to claim 6, wherein the bearing element (6) has an outer face (17) received in the carrying element (5) and provided with connecting channels (19) so as to connect the pressure pockets (13, 13a) via throttle bores to the means for supplying a pressure agent.

8. A bearing assembly according to claim 6, wherein the pressure pockets (13, 13a) take up an area percentage of approximately 70 to 90% of the area of the bearing element (6) facing the guiding faces (9) and the supplementary guiding faces (10).

9. A bearing assembly according to claim 1, wherein the bearing element (6) is provided with a collecting groove (18) arranged at a distance from a border edge (22) of the pressure pocket (13) so as to extend around it, be open towards the guiding faces (9, 10) and connected to a collecting pipeline (19).

10. A bearing assembly according to claim 1, wherein the guiding rail (3), in the region of the fixing portion (7), is provided with two additional supplementary guiding faces (10a, 10b) arranged at an angle ($\beta$) relative to adjoining guiding faces (9a, 9e).

11. A bearing assembly according to claim 10, wherein one supplementary guiding face (10a, 10b) and an adjoining guiding face (9a, 9b) always enclose an angle ($\beta$) of at most 90° between them.

12. A bearing assembly according to claim 10, wherein the bearing element includes a running face (12) having a carrying face (20) which rests in a pressure-less condition with pretension against the guiding faces (9, 10).

13. A bearing assembly according to claim 1, wherein the bearing element includes a running face (12) having a carrying face (20) which rests in a pressure-less condition with pretension against the guiding faces (9, 10).

14. A bearing assembly according to claim 1, wherein the at least one pressure pocket (13) takes up an area percentage of approximately 70 to 90% of the area of the bearing element (6) facing the guiding faces (9).

15. A bearing assembly according to claim 1, wherein the bearing element has a running face (12) with a guiding portion have a finish-dimension which is broached after the bearing element is fixed to an associated carrying element (5).

16. A bearing assembly according to claim 1, wherein the pressure pockets (13) have a depth of 0.5 to 1 mm.

17. A bearing assembly according to claim 1, wherein said at least one carrying element includes a plurality of carrying elements separately supported on a slide, each carrying element having a separate bearing element, each of which has at least one pressure pocket and connecting means for connecting together the pressure pockets of all of the bearing elements and for connecting said pockets to a source of pressure agent.

18. A bearing assembly according to claim 1, wherein a plurality of pressure pockets is provided, said means for supplying a pressure agent including connections (15, 24) on said at least one carrying element (5), pipelines (21) for the pressure agent provided so as to connect the pressure pockets (13, 13a) of said carrying element to each other and to a pressure source (16), and channels (17, 25) arranged so as to open into the pressure pockets (13, 13a).

19. A bearing assembly according to claim 1, wherein said at least one pressure pocket (13) faces all the guiding faces (9, 10) of the bearing element (6).

20. An improved hydrostatic bearing assembly for accommodating horizontal and/or vertical bearing forces for a slide movable along a guiding rail and associated with at least one separate bearing element which has been provided with at least one pressure pocket facing a guiding face of the guiding rail and connected to a pressure agent pipeline which is provided with a pressure agent by a pressure source via pipelines, wherein the improvement comprises: the guiding rail (3), viewed in cross-section, being a polygon with guiding faces (9a–e) and a fixing portion (7); the bearing element (6) being a separate component received in a separate carrying element (5) fixable to the slide (2), so that both of them, as one unit, partially embrace the guiding rail (3); and the bearing element (6) facing the guiding faces (9a–e) of the guiding rail (3) containing the pressure pockets (13, 13a).

21. A hydrostatic bearing assembly for a slide, comprising:
    at least one guiding rail (3) having a polygonal cross-section with a guiding portion having guiding faces (9a–e), and a fixing portion (7), said slide being movable along said guiding rail;
    at least one carrying element (5) fixable to said slide (2);
    a separate bearing element (6) formed as an aluminum pressure dye casting arranged in said carrying element (5), said carrying element and said bearing element being formed so as to partially embrace said guiding rail as a single unit so that said bearing element faces the guiding faces of the guiding rail, said bearing element having at least one pressure pocket arranged so as to face at least one of the guiding faces of the guiding rail; and
    means for supplying a pressure agent to said at least one pressure pocket.

22. A hydrostatic bearing assembly for a slide, comprising:
    at least one guiding rail (3) having a polygonal cross-section with a guiding portion having guiding faces (9a–e), and a fixing portion (7), said slide being movable along said guiding rail;
    at least one carrying element (5) fixable to the slide (2);
    a separate bearing element (6) formed as an plastic injection molded part arranged in said carrying element (5), said carrying element and said bearing element being formed so as to partially embrace said guiding rail as a single unit so that said bearing element faces the guiding faces of the guiding rail, said bearing element having at least one pressure pocket arranged so as to face at least one of the guiding faces of the guiding rail; and
    means for supplying a pressure agent to said at least one pressure pocket.

* * * * *